(12) United States Patent
Gaunekar et al.

(10) Patent No.: US 7,202,956 B2
(45) Date of Patent: Apr. 10, 2007

(54) TRANSLATION MECHANISM FOR OPTO-MECHANICAL INSPECTION

(75) Inventors: Ajit S. Gaunekar, Singapore (SG); Gary Peter Widdowson, Hong Kong (HK)

(73) Assignee: ASM Technology Singapore Pte Ltd., Singapore (SG)

( * ) Notice: Subject to any disclaimer, the term of this patent is extended or adjusted under 35 U.S.C. 154(b) by 236 days.

(21) Appl. No.: 10/962,119

(22) Filed: Oct. 8, 2004

(65) Prior Publication Data
US 2006/0077399 A1    Apr. 13, 2006

(51) Int. Cl.
*G01B 11/24* (2006.01)
(52) U.S. Cl. ..................... 356/603; 356/607
(58) Field of Classification Search ........ 356/601–622; 318/651, 560; 250/237 G, 231.14
See application file for complete search history.

(56) References Cited
U.S. PATENT DOCUMENTS

| | | | |
|---|---|---|---|
| 4,969,739 A * | 11/1990 | McGee | 356/308 |
| 5,109,366 A * | 4/1992 | Moriya et al. | 369/30.14 |
| 5,307,152 A | 4/1994 | Boehnlein et al. | 356/376 |
| 5,336,983 A * | 8/1994 | Watanabe | 318/651 |
| 5,444,240 A * | 8/1995 | Nakayama | 250/237 G |
| 5,509,090 A | 4/1996 | Maruyama et al. | 382/276 |
| 5,610,885 A * | 3/1997 | Takahashi | 369/44.28 |
| 6,774,981 B1 * | 8/2004 | Watson et al. | 355/53 |
| 2003/0035349 A1 | 2/2003 | Widdowson et al. | 369/44.14 |
| 2004/0028333 A1 | 2/2004 | Lomas | 385/39 |

* cited by examiner

*Primary Examiner*—Hoa Q. Pham
(74) *Attorney, Agent, or Firm*—Ostrolenk, Faber, Gerb & Soffen, LLP

(57) ABSTRACT

An apparatus is disclosed for moving an optical component of an opto-mechanical inspection system relative to an object to be inspected using a linear actuator comprising a coil located in a magnetic field created by a magnet assembly. A translation stage is coupled to either of said coil and magnet assembly whereby the translation stage is configured for motion relative to the other of said coil and magnet assembly. Movement of the translation stage is configured along a plane that is substantially perpendicular to a direction of incident light projected from a light source through the optical component onto the object.

17 Claims, 3 Drawing Sheets

TRANSLATION MECHANISM FOR OPTO-MECHANICAL INSPECTION

FIELD OF THE INVENTION

The invention relates to the optical inspection of a surface contour of an object using three-dimensional imaging techniques, and in particular to a mechanism used for moving a component of an opto-mechanical system relative to the object during such three-dimensional imaging.

BACKGROUND AND PRIOR ART

In the semiconductor manufacturing and assembly industry, it is sometimes necessary to visually inspect the surfaces of electronic components to ensure that there are no defects. Machines in the industry often use computerized vision systems for various purposes such as for monitoring processes and inspecting finished or intermediate product outputs from individual machines. In one instance, after molding to form a semiconductor package, it is prudent to inspect the surface of the package for cavities or unacceptable unevenness of the surface. In such instances, three-dimensional optical inspection systems would be most ideal because of the ability to detect depth within the optical system's field of vision.

Inspection of semiconductor interconnects is especially crucial to ensure defect-free assembly of devices on printed circuit boards and flex circuits. Before assembly of semiconductor devices, two-dimensional (2-D) inspection of electronic components can ascertain if bumps or leads are missing or out of alignment, while three-dimensional (3-D) inspection can confirm that an electronic component is of a proper size and shape. 3-D inspection can also detect distortions of the surface contours of the substrate as aforesaid.

Among the several non-contact, optical methods of obtaining 3-D images of objects, one involves the projection of a grating image onto the object under scrutiny. FIG. 1 is a schematic illustration of an opto-mechanical inspection system of the prior art using a phase shifting technique with grating projection. A sinusoidal diffusion grating 10 comprising multiple equidistant and parallel lines or bars is frequently used for this purpose. Collimated light 12a incident on the sinusoidal grating 10 emerges as a modulated beam 12b such that its intensity has a unidirectional, sinusoidal spatial profile 14. This intensity-modulated beam 12b is incident over an object 16 to be inspected. The reflected beam 18 has a distorted intensity profile 20, the distortion being the result of the height variation of the object 16. The grating 10 is typically moved along its plane incrementally through a specific distance each time relative to the object 16. The direction of the motion is generally perpendicular to the orientation of the grating lines. Between successive strokes, images of the grating lines projected on the object are captured by a CCD camera that is positioned to view the distorted intensity profile 20 of the reflected beam 18.

In general, the grating 10 is moved through small incremental distances, typically fractions of a millimeter with accuracy of the order of 1–2 microns. At each position of the grating 10, an image of the pattern of the lines formed on the surface is captured by the CCD camera and recorded. A combination of these patterns gives rise to a depth profile along the surface of the object 16 so that its surface contour can be determined. Vision algorithms based on intensity and phase variations between these images are used to compute the height profile of the object. With the demands of modern-day semiconductor manufacturing and assembly systems, the motion of the grating has to be executed speedily and the grating positioned precisely at required locations in order to get accurate depth measurements while maintaining a high throughput.

In order to achieve the said speed and accuracy, the movement of the grating should preferably be actuated by a mechanism that is highly precise. Prior art apparatus for displacement of optical components are flawed in this respect. For example, U.S. Patent Publication No. 2004/28333 for "Tunable Optical Filter" teaches the use of an actuation means including a threaded drive shaft whose thread has leading and trailing thread faces. Threaded nut regions resiliently engage the thread faces of the drive shaft, the threaded nut regions being in communication with a filter plate for moving the filter plate relative to a radiation beam in response to rotation of the drive shaft member relative to the threaded nut regions. The drive shaft member is connected to a stepper motor, d.c. motor or linear motor for controllably rotating the drive shaft. In another prior art example, U.S. Pat. No. 5,307,152 for a "Moiré Inspection System" discloses the mounting of a grating on a translation stage that comprises a precision motorized micrometer that is used to drive the translation stage.

These prior art examples use motors that basically convert rotary motion to linear motion to control translation of the grating and are insufficiently precise for higher performance requirements, especially as there are a number of disadvantages associated with their designs. For instance, for practical reasons, a rotating screw and an associated nut that is movable on the screw cannot be coupled too tightly together so as to allow one to move relative to the other. Therefore, gaps exist between corresponding threads of the screw and nut that can give rise to backlash and hysteresis problems, especially during fast motion involving a change of direction of motion. Furthermore, the gap often gives rise to an offset between rotary and corresponding linear motion, which retards its ability to execute quick and accurate motion.

Therefore, it would be desirable to employ a displacement mechanism for the optical grating that avoids some of the above problems with the said prior art mechanisms. Furthermore, it would also be desirable to introduce a frictionless and wear-free structural support for sliding displacement of the grating. Conventional supports utilize roller bearings that encounter wear while rolling over surfaces and they lack accuracy and repeatability because of friction from contact with the surfaces on which they slide. It would be advantageous to implement a new support mechanism that has higher accuracy and repeatability. Flexures are especially suited for these purposes due to the excellent inherent repeatability of their motion trajectory devoid of friction and wear.

SUMMARY OF THE INVENTION

It is therefore an object of the invention to seek to provide an improved translation mechanism that is usable to move a component of an opto-mechanical inspection system relative to an object to be inspected more precisely and repeatably as compared to the aforesaid prior art mechanisms.

Accordingly, the invention provides an apparatus for moving an optical component of an opto-mechanical inspection system relative to an object to be inspected, comprising: a light source operative to project incident light onto the object through the optical component; a linear actuator comprising a coil located in a magnetic field created by a magnet assembly; and a translation stage coupled to either of said coil and magnet assembly whereby the translation stage is configured for motion relative to the other of said coil and magnet assembly along a plane that is substantially perpendicular to a direction of said incident light.

It would be convenient hereinafter to describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of an apparatus in accordance with the invention will now be described with reference to the accompanying drawings, in which.

DETAILED DESCRIPTION OF THE PREFERRED EMBODIMENT

Figure 3:
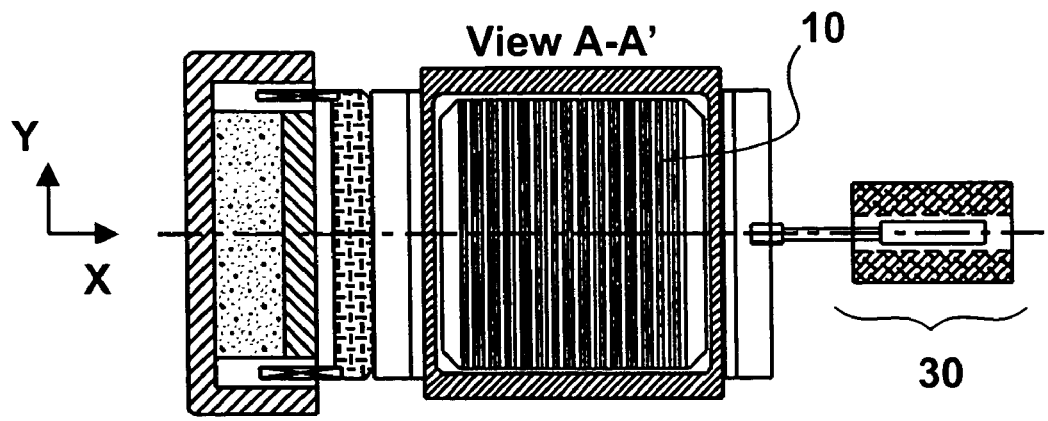
FIG. 3 is a sectional plan view of the opto-mechanical inspection system as viewed along line A–A' of FIG. 2.
Figure 2:
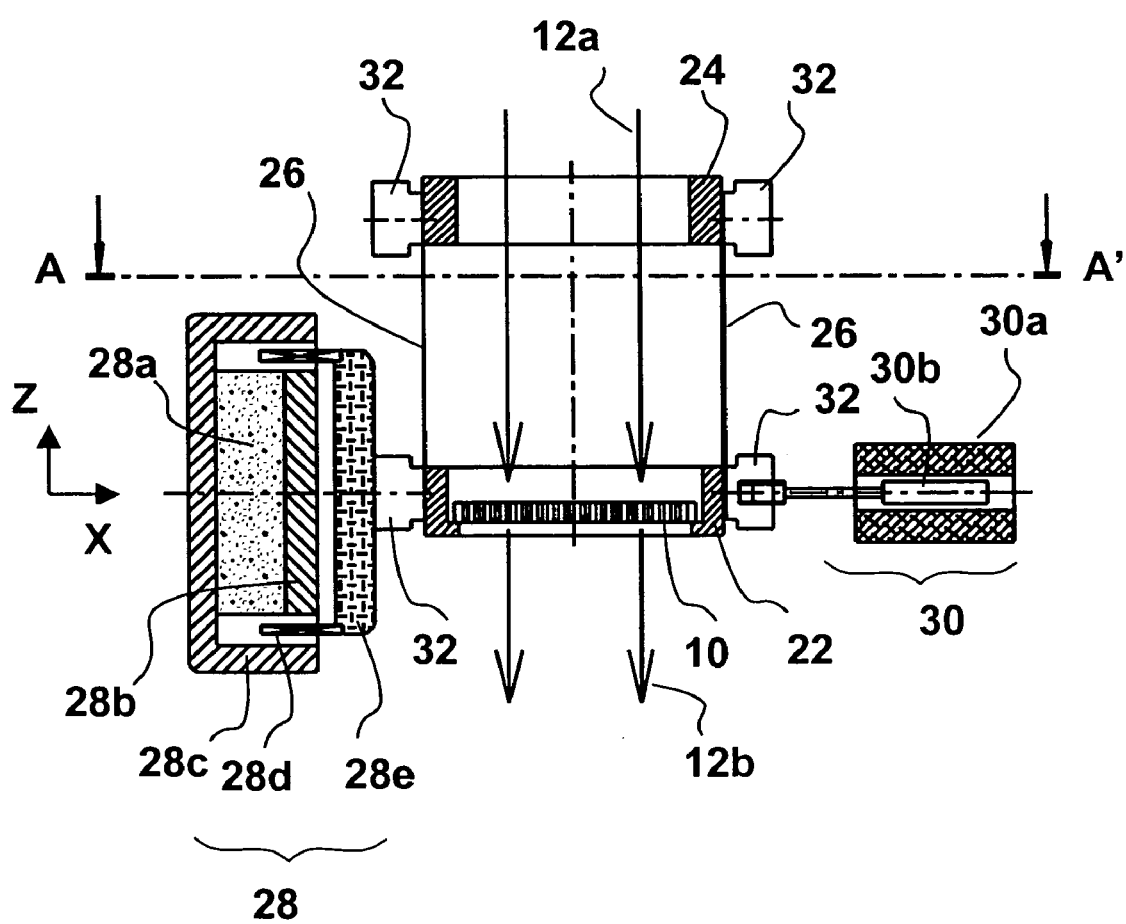
FIG. 2 is a side view of an opto-mechanical inspection system incorporating a displacement mechanism according to the preferred embodiment of the invention.

A preferred embodiment of the present invention will be described with reference to FIGS. 2 and 3. FIG. 2 is a side view of an opto-mechanical inspection system incorporating a displacement mechanism according to the preferred embodiment of the invention, whereas FIG. 3 is a sectional plan view of the opto-mechanical inspection system as viewed along line A–A' of FIG. 2. The component to be moved, such as an optical component in the form of a diffusion grating 10, is suitably mounted and affixed onto a translation stage comprising a lightweight movable frame 22. It is also conceivable that an object to be inspected may be mounted on the translation stage instead for relative motion between the object and the optical component, although this is less preferable.

In the described embodiment, the grating lines are oriented in direction Y of the Cartesian reference frame XYZ as shown in FIG. 2, and a light source (not shown) is operative to project incident light 12a, 12b in a direction parallel to direction Z. Accordingly, the diffusion grating 10 is oriented perpendicular to the incident light 12a, 12b and is configured to move along a plane that is substantially perpendicular to the direction of the said incident light. The movable frame 22 is suspended from a relatively fixed frame 24 using flexible strips of material or flexures 26 (shown in greater detail in FIG. 4). The flexures 26 are coupled to the movable frame 22 at one end and the fixed frame 24 at an opposite end. Preferably, two flexures 26 separated by a suitable distance and aligned along the axis of motion of the movable frame 22 are used to support the movable frame 22 during its motion.

The flexures 26 are preferably in the form of flat sheets, fractions of a millimeter thick. They are machined using either wire electro-discharge machining or photo-lithography or any other suitable method, yielding one or more flexing "arms" which bear the load of the moving member. They are preferably made from stainless steel or beryllium copper. Very high ratios of lateral stiffness to in-line stiffness can be realized using such flexures.

Actuation of the mechanism using flexures is effected by a direct drive actuator such as a linear motor, and more preferably, a voice coil motor 28. The voice coil motor 28 could be of one of several possible topologies but in the present case it is cylindrical. The voice coil motor 28 is hereafter described with reference to FIG. 2. A stationary magnet assembly of the voice coil motor 28 comprises an axially magnetized permanent magnet 28a in the shape of a ring, which is glued co-axially to an outer pole 28c. The permanent magnet 28a is made of a high energy density material such as neodymium ferrous boron. A ring shaped inner pole 28b is glued onto the magnet. The inner pole 28b and outer pole 28c are both made of magnetically permeable iron alloy.

The annular air gap between the inner pole 28b and outer pole 28c contains a radial magnetic field. When a coil 28d mounted on coil support 28e and appropriately positioned in the annular magnetic air gap, is energized by an electric current, an axial force is induced on it because of the presence of the radial magnetic field. When the direction of the current is reversed, the force on the coil 28d is also reversed. The above-described voice coil motor 28 is thus used to move and position the moving frame 22 and with it the grating 10. The movable frame 22 may either be coupled to the coil support 28e (as shown) or alternatively, to the magnet assembly. Alternative topologies of voice coil motors may be used in place of the voice coil motor 28 described above.

Figure 1:
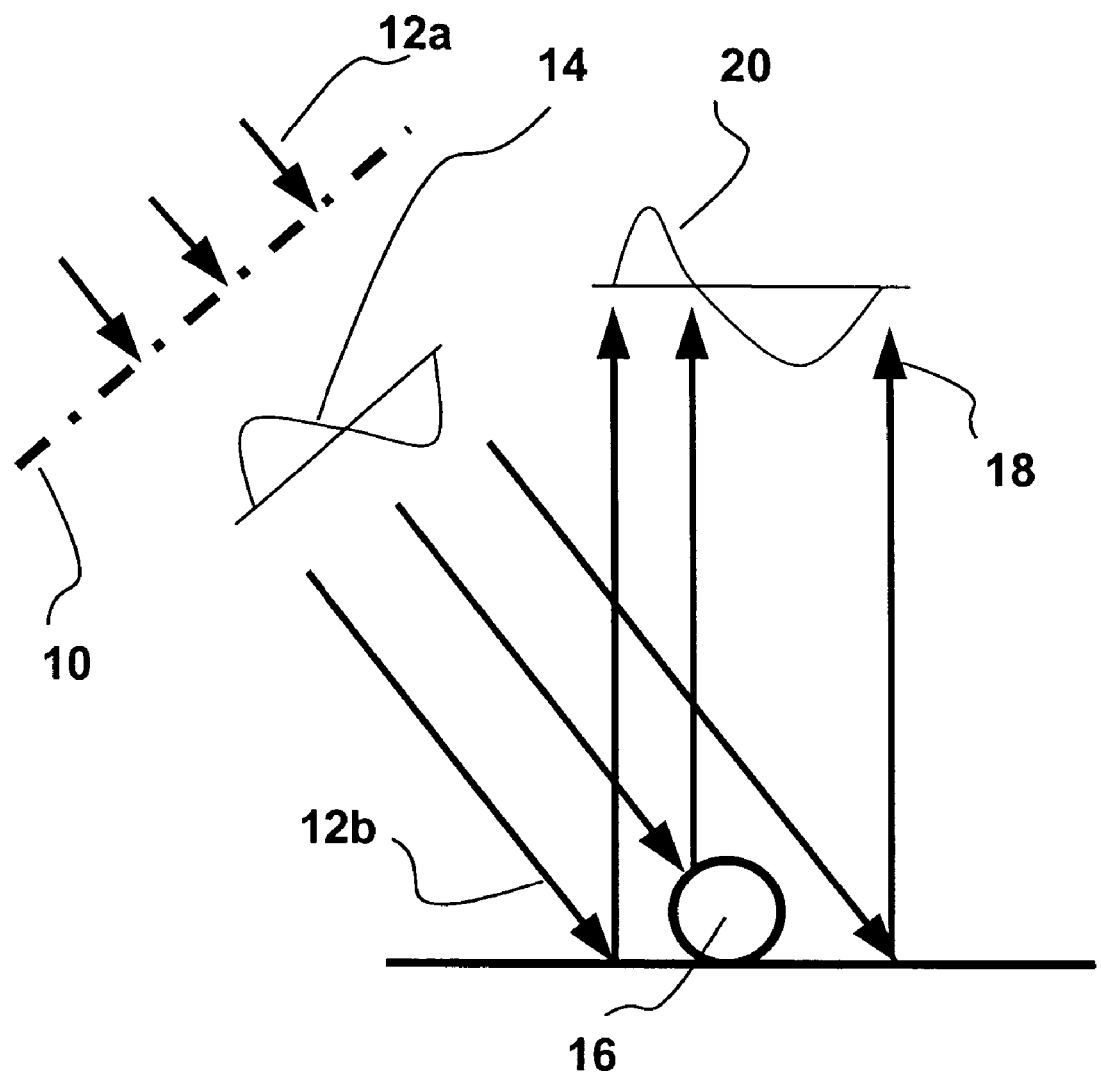
FIG. 1 is a schematic illustration of an opto-mechanical inspection system of the prior art using a phase shift principle with grating projection.

The mechanism is intended to achieve a highly repeatable motion trajectory of the grating 10, very closely approximating straight line motion in a direction perpendicular to the grating lines and substantially co-planar with the grating itself, yielding a means whereby the image of the grating can be projected onto the object of interest (as schematically shown in FIG. 1) at slightly different locations at different times without manual intervention.

The movable frame 22 is further coupled to a position sensor. A position sensor such as an LVDT (Linear Variable Differential Transducer) 30 provides position feedback on the movable frame 22 and grating 10 enabling the motor 28 to be operated in closed loop servo mode for very precise control over the axial position of the grating 10 mounted on the movable frame 22. The LVDT 30 comprises a stationary sensor head 30a, which usually comprises a coil winding assembly, and a moving ferromagnetic core 30b whereby to provide real-time feedback to the closed loop control system which controls the voice coil motor 28 and in turn, the position of the movable frame 22 to the desired precision. Any other sensor such as a capacitive, inductive or optical sensor may be suitably used in place of the LVDT 30. The ferromagnetic core 30b of the LVDT 30 is affixed to the movable frame 22 in such a way that the core is nominally co-axial with the LVDT sensor head 30a. The entire LVDT assembly 30 is positioned to be substantially symmetric about the movable frame 22.

Figure 5:
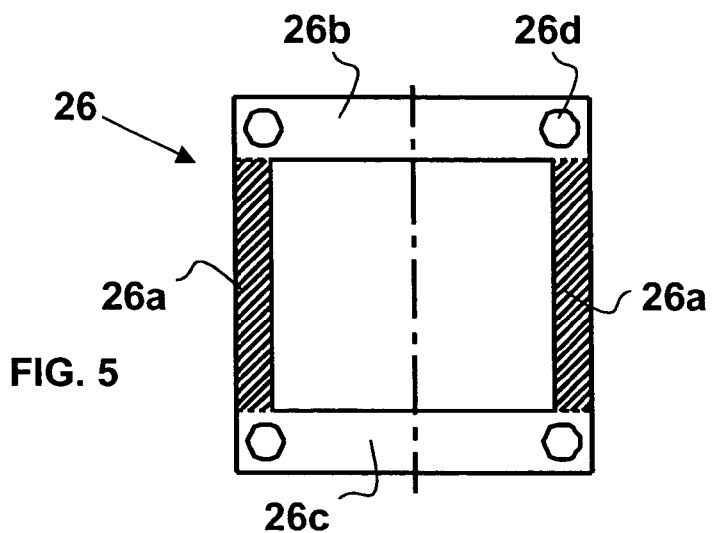
FIG. 5 is a side view of the flexure support system looking from direction B of FIG. 4.
Figure 4:
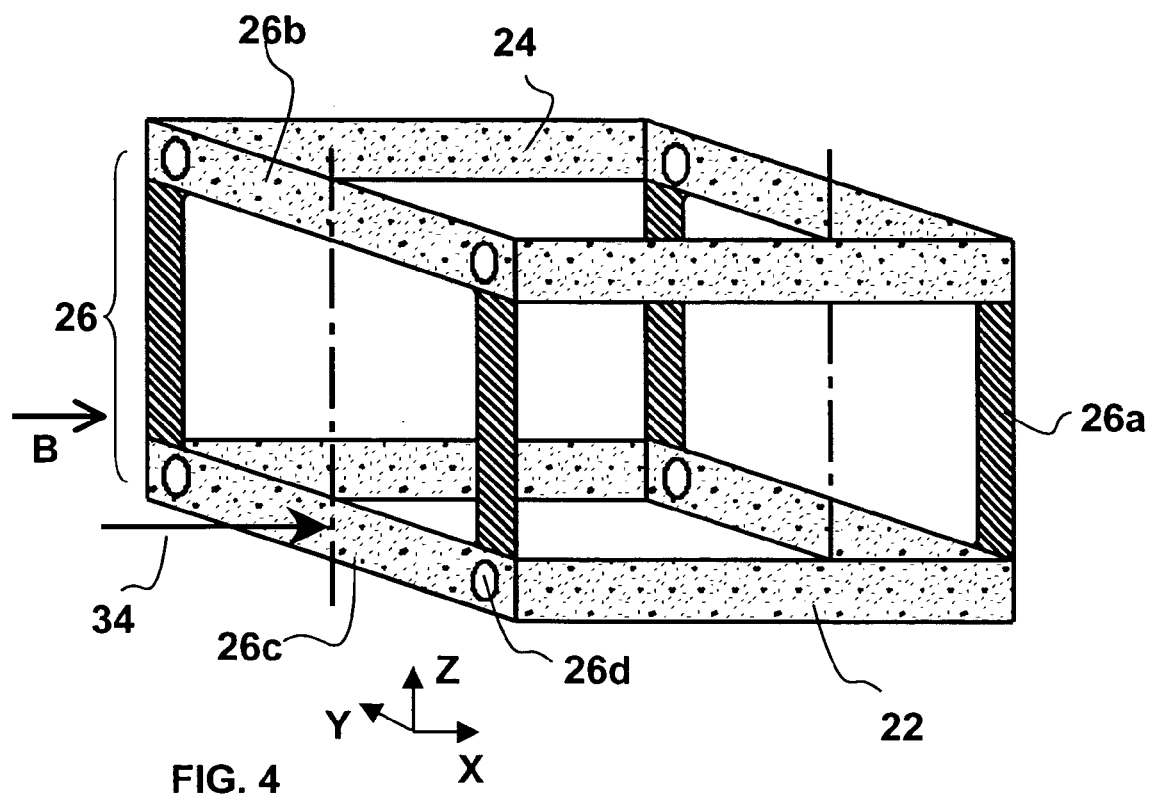
FIG. 4 is an isometric view of the flexure support system according to the preferred embodiment of the invention.

FIG. 4 shows the flexure 26 with multiple flexing portions 26a spaced from one another wherein its flexing portions 26a are shaded. The remaining portions 26b and 26c do not flex and are used to mount the flexure onto the fixed frame 24 and movable frame 22 respectively using mounting holes 26d and clamping plates 32. The clamping plates 32 are shaped to fully cover the non-flexing portions 26b and 26c of the flexure 26. FIG. 5 shows the flexure bearing assembly consisting of a single flexure strip 26, each with two flexing portions 26a.

Referring again to FIG. 4, the mutual coupling of the four flexing portions 26a of the flexure bearing assembly shown in FIG. 4 imparts to the entire assembly a high torsional rigidity. In particular, a very high lateral stiffness in the Y axis is imparted by orienting the planar surfaces of each sheet of flexure 26 substantially perpendicular to the axis of motion of the movable frame 22. Meanwhile, this configuration keeps the in-line stiffness along the X axis much lower so as to facilitate motion in the X direction. The configuration thus imparts to the entire assembly a high torsional rigidity about all three axes X, Y and Z.

Furthermore, the movable part of the mechanism is actuated by the voice coil motor 28 in such a way that the effective actuating force 34 is nominally symmetric with the movable frame and is substantially in line with the centre of gravity of the entire moving mass that comprises the movable frame 22. This avoids the generation of any considerable turning moment about the Z axis, which is perpendicular to the plane of the grating. This virtually eliminates "yaw" error deviation from rectilinear motion of the grating 10, which might otherwise adversely affect the imaging process.

It should be appreciated that a high precision motion stage has been disclosed in the preferred embodiment of the invention which is used to accurately position a component of an opto-mechanical inspection system, such as an optical diffusion grating. The motion stage preferably uses a voice coil motor as a direct drive actuator. Moreover, use of flexure bearings ensures freedom from friction/stiction thus facilitating high resolution and repeatability without any wear that accompanies and adversely affects conventional bearings.

The invention described herein is susceptible to variations, modifications and/or additions other than those specifically described and it is to be understood that the invention includes all such variations, modifications and/or additions which fall within the spirit and scope of the above description.

The invention claimed is:

1. An apparatus for moving an optical component of an opto-mechanical inspection system relative to an object to be inspected, comprising:
   a light source operative to project light along a path onto the object through the optical component;
   a linear actuator comprising a coil located in a magnetic field created by a magnet assembly;
   a translation stage coupled to either of said coil and magnet assembly and configured to be movable relative to the other of said coil and magnet assembly along a plane that is substantially perpendicular to the path of said projected light;
   a relatively fixed support that is spaced from the translation stage alone the path of the projected light; and
   a flexible strip of material connecting the translation stage to the relatively fixed support that is operative to support the translation stage during its motion.

2. The apparatus according to claim 1, wherein the optical component is mounted on the translation stage.

3. The apparatus according to claim 1, wherein the optical component is a diffusion grating.

4. The apparatus according to claim 1, wherein an effective actuating force from the linear actuator is nominally symmetric with the translation stage and substantially in line with a center of gravity of a mass moved by said actuating force that comprises the translation stage.

5. The apparatus according to claim 1, wherein the flexible strip of material is coupled to the translation stage at one end and to a relatively fixed support at an opposite end.

6. The apparatus according to claim 1, including a second flexible strip of material coupled to the translation stage that is aligned with said flexible strip of material along an axis of motion of the translation stage but spaced apart from said flexible strip of material.

7. The apparatus according to claim 1, wherein the flexible strip of material comprises multiple flexing portions spaced from one another.

8. The apparatus according to claim 1, wherein the flexible strip of material is configured such as to provide a high level of stiffness to motion of the translation stage along an axis that is perpendicular to an axis of motion of the translation stage.

9. The apparatus according to claim 8, wherein the flexible strip of material comprises a sheet of material and planar surfaces of the sheet are oriented substantially perpendicular to an axis of motion of the translation stage.

10. The apparatus according to claim 1, wherein the flexible strip is configured to provide high torsional rigidity to all axes of motion of the translation stage.

11. The apparatus according to claim 1, wherein the flexible strip of material is made from stainless steel or beryllium copper.

12. The apparatus according to claim 1, wherein the translation stage is further coupled to a position sensor that is operative to provide feedback regarding a position of the translation stage.

13. The apparatus according to claim 12, wherein the position sensor is positioned substantially symmetrically about the translation stage.

14. The apparatus according to claim 12, wherein the translation stage and position sensor are connected in a closed loop position feedback system.

15. The apparatus according to claim 12, wherein the position sensor is selected from the group consisting of a linear variable differential transducer, capacitive sensor, inductive sensor and optical sensor.

16. The apparatus according to claim 15, where the linear variable differential transducer comprises a ferromagnetic core disposed within a sensor head comprising a coil winding assembly.

17. The apparatus according to claim 16, wherein the ferromagnetic core is coupled to the translation stage and is nominally co-axial with the sensor head.

* * * * *